United States Patent
Ota et al.

(10) Patent No.: US 11,539,464 B2
(45) Date of Patent: Dec. 27, 2022

(54) RETRANSMISSION CONTROL METHOD

(71) Applicant: Nippon Telegraph and Telephone Corporation, Tokyo (JP)

(72) Inventors: Atsushi Ota, Tokyo (JP); Naoki Kita, Tokyo (JP); Yutaka Imaizumi, Tokyo (JP); Satoshi Kurosaki, Tokyo (JP); Kazuto Goto, Tokyo (JP); Kota Ito, Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 124 days.

(21) Appl. No.: 17/042,314

(22) PCT Filed: Mar. 19, 2019

(86) PCT No.: PCT/JP2019/011576
§ 371 (c)(1),
(2) Date: Sep. 28, 2020

(87) PCT Pub. No.: WO2019/188615
PCT Pub. Date: Oct. 3, 2019

(65) Prior Publication Data
US 2021/0021377 A1   Jan. 21, 2021

(30) Foreign Application Priority Data

Mar. 29, 2018 (JP) .............................. JP2018-066047

(51) Int. Cl.
*H04L 1/08* (2006.01)
*H04L 1/18* (2006.01)
*H04W 72/04* (2009.01)

(52) U.S. Cl.
CPC ............. *H04L 1/08* (2013.01); *H04L 1/18* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 6,069,924 A * | 5/2000 | Sudo | H04L 27/2332 375/330 |
| 2002/0063982 A1 * | 5/2002 | Kim | G11B 20/10009 360/75 |

(Continued)

FOREIGN PATENT DOCUMENTS

| JP | 2004-297200 | | 10/2004 |
|---|---|---|---|
| JP | 2008079350 A | * | 4/2008 |

(Continued)

OTHER PUBLICATIONS

Ohara et al., "Characteristics Comparison of Overlap FDE and Interblock Interference Canceller in Single-Carrier Transmission," The Institute of Electronics, Information and Communication Engineers, 2011, 110(433):25-29, 11 pages (with English Translation).

*Primary Examiner* — The Hy Nguyen
(74) *Attorney, Agent, or Firm* — Fish & Richardson P.C.

(57) ABSTRACT

A receiving station performs first signal detection processing on a received radio signal, performs a retransmission request to a transmitting station in a case in which a code error is detected in a detected radio packet for user data, and enqueues the radio packet in a reception buffer in a case in which no code error is detected. In parallel with the first signal detection processing, the receiving station performs second signal detection processing on the received signal with a longer processing delay than that of the first signal detection processing, and in a case in which no code error is detected in the detected radio packet for user data, the receiving station enqueues the radio packet in the reception buffer. The receiving station outputs, at a predetermined timing, the radio packet for user data with no code error (Continued)

detected, the radio packet being enqueued in the reception buffer.

11 Claims, 8 Drawing Sheets

(56) References Cited

U.S. PATENT DOCUMENTS

| | | | | |
|---|---|---|---|---|
| 2008/0192705 A1* | 8/2008 | Suzuki | ............... | H04L 1/1692 370/335 |
| 2011/0051599 A1* | 3/2011 | Tanigawa | ............ | H04L 1/1893 370/225 |
| 2011/0078531 A1* | 3/2011 | Umeda | ............... | H04L 1/0016 714/751 |
| 2018/0076992 A1 | 3/2018 | Nabetani et al. | | |
| 2019/0361486 A1* | 11/2019 | Malik | ................. | G06F 30/39 |

FOREIGN PATENT DOCUMENTS

| | | | |
|---|---|---|---|
| JP | 2008227666 A | * | 9/2008 |
| JP | 2017038187 A | * | 2/2017 |
| JP | 2018-046459 | | 3/2018 |
| KR | 10-0937406 B1 | * | 1/2010 |

* cited by examiner

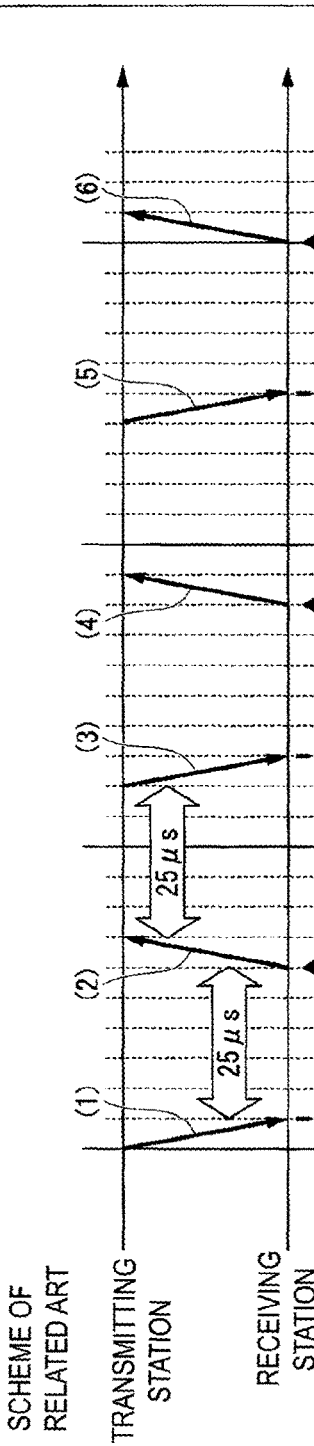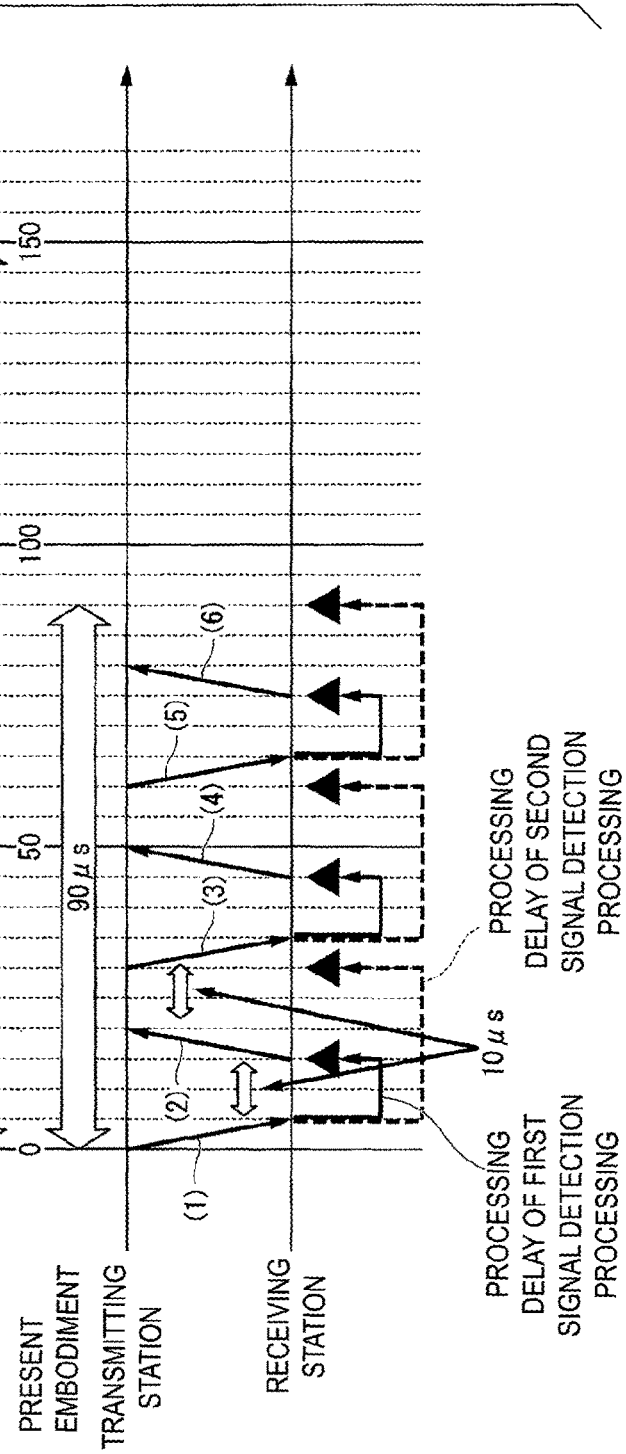
Fig. 4A
Fig. 4B

RETRANSMISSION CONTROL METHOD

CROSS-REFERENCE TO RELATED APPLICATIONS

This application is a National Stage application under 35 U.S.C. § 371 of International Application No. PCT/JP2019/011576, having an International Filing Date of Mar. 19, 2019, which claims priority to Japanese Application Serial No. 2018-066047, filed on Mar. 29, 2018. The disclosure of the prior application is considered part of the disclosure of this application, and is incorporated in its entirety into this application.

TECHNICAL FIELD

The present invention relates to a retransmission control method.

BACKGROUND ART

High-performance mobile communication terminals, such as smart phones, are currently being widely implemented at a rapid rate. Mobile telephones have transitioned to the fourth generation mobile communication from the third generation mobile communication, and further research and development of the fifth generation mobile communication (commonly referred to as "5G") are progressing. In 5G, a transmission speed target value is set to 10 Gbit/s (gigabits per second) or higher, and a required condition for a delay time is also set to 1 ms (millisecond).

Although details of such a required condition for a delay time are not clearly defined, a delay is generally interpreted as an end-end transmission delay. In the case of transmission through the Internet, there is a risk of delay times being not covered to be assured. Moreover, even if transmission is performed in a predetermined distance using a dedicated line, a situation with a propagation delay exceeding 1 ms is likely to occur. Thus, the required condition "1 ms" is interpreted as an end-end delay time in a region in which a service offering entity (e.g., a server providing information, a computer performing any processing, a network apparatus performing routing processing or networking processing, or the like) is close to users, although the service is provided via a 5G wireless network. For example, when various types of vehicle-to-vehicle communication via a base station are assumed, the entities go through a radio section of an access system for two round trips, and thus it takes at most 500 μs (microseconds) for one side. If a radio circuit is also used for an entrance circuit in consideration of convenient installation and the like, two hops are required within 500 μs, and conditions are more strict.

In a case in which such low latency services are provided via radio sections, it is difficult in principle to achieve various low error rates such as that achieved with optical fibers. Taking fading and various quality degradation factors into consideration, a circuit design that allows a considerable margin is required in order to achieve a desired error rate in a single transmission operation. However, because this design is inefficient in terms of transmission efficiency, it is common to achieve a desired error rate in a plurality of transmission operations by means of retransmission control.

In retransmission control, (1) transmission of a signal from a transmitting station to a receiving station and reception at the receiving station, and (2) transmission of a response signal from the receiving station to the transmitting station and reception at the transmitting station are generally repeated. A time required for the signal processing performed in (1) and (2) is generally constant, and the time is assumed to be $T_{1way}$.

At this time, a time required for transmission in a case without retransmission is $T_{1way}$, a time required for one retransmission operation (two transmission operations) is $3 \times T_{1way}$, a time required for two retransmission operations (three transmission operations) is $5 \times T_{1way}$, ..., and thus a time required for retransmission increases as the number of retransmission operations increases.

Next, in radio transmission requiring such low latency, performing single carrier transmission has become mainstream. For example, in the case of single carrier transmission, if a signal is received, a signal in a payload region storing actual user data is received after timing detection or channel estimation using a unique word or the like, and at the same time, signal demodulation processing can be performed immediately. If a preamble signal such as a unique word or the like is given to the transmission side, a signal can be transmitted immediately after modulation processing of the transmission data.

Meanwhile, in an Orthogonal Frequency Division Multiplexing (OFDM) modulation scheme that has become mainstream in microwave bands, time is required for signal processing. For example, to exemplify reception processing, if reception of one signal of an OFDM symbol is not completed, it is not possible even to start Fast Fourier Transform (FFT) processing. If a guard interval of 512 points is added in a 2048-point FFT system and then sampling data of 2560 samples is not received, it is not possible to start the FFT processing.

Similarly, even if modulation processing for a signal to be transmitted on some subcarriers is completed on the transmission side, it is not possible to start Inverse Fast Fourier Transform (IFFT) processing without completing modulation processing on signals of all subcarriers. Further, it is common to interleave the signals to be transmitted. Because the transmission side switches order of data sequences through interleaving and transmits them in the entire bands, a waiting time for the switching is required.

Because the reception side performs deinterleaving corresponding to reversed processing of the above, processing times of the above-described operations are added together, which results in an increase in $T_{1way}$.

Although single carrier transmission is generally superior in terms of delay time as described above, if the effects of reflected waves are not negligible, there is a problem of characteristics of the single carrier transmission deteriorating. The OFDM modulation scheme is a technique for compensating for the effects of frequency selectivity distortion, and a Single Carrier Frequency Domain Equalization (SC-FDE) technology has also been proposed as a combination of single carrier and the OFDM modulation scheme.

In the SC-FDE technology, the transmission side adds a training signal to the beginning of a transmission signal, the training signal enabling channel estimation for each subcarrier. The reception side receives the training signal and performs channel estimation for each subcarrier. The transmission side transmits a modulated signal for single carrier transmission following the training signal. The transmission side adds a cyclic prefix signal (hereinafter referred to as a CP) to the modulated signal to remove the effects of a delay wave. The reception side removes the CP from the received signal and performs an FFT on this signal. After the FFT, the reception side divides the FFT result by channel information estimated in advance to perform frequency domain equalization processing, and then performs an IFFT on the channel-equalized signal to return the signal back to a signal on the time axis.

Regarding the addition of a CP, for example, Non-Patent Literature 1 and the like have proposed an Overlap Frequency Domain Equalization (FDE) technology and the like, and in this case, the addition of a CP can be omitted. In the Overlap FDE technique, although a load of processing performed on the reception side slightly increases, it is only required for the transmission side to perform the same signal processing as that in single carrier transmission (except the addition of a training signal for channel estimation or the like).

In this manner, the reception side performs demodulation processing using a signal for single carrier transmission that has been subjected to the frequency domain equalization processing. Although characteristics improve due to the frequency domain equalization processing, a processing delay resulting from signal processing of course increases. Although it is possible to perform signal detection processing without deliberately performing equalization processing on the reception side in the same manner as the Overlap FDE technology disclosed in Non-Patent Literature 1, the characteristics of signal detection can be significantly improved by performing equalization processing on the reception side.

Hereinafter, description of retransmission control performed when a code error occurs on a radio circuit will be provided.

As described above, code errors are unavoidable in radio communication and error compensation is typically performed through retransmission control in a case in which code errors are not acceptable due to a relationship between a code error probability and an impact at a code error time. User data constitutes a radio packet (hereinafter referred to as a Protocol Data Unit (PDU)) having a pre-determined length, a sequence number and an error detection code are added to the PDU, and then the PDU is transmitted. A receiving station makes a retransmission request when an error is detected in the PDU by checking error detection codes. In a retransmission request method, for example, there are methods of a Stop&Wait type, a Go-Back-N type, in addition to a selective retransmission type, and the like, and other than a case in which code error notification is performed with a Negative-ACKnowledgement (NACK) for detection of a code error, normal reception notification is performed with an ACKnowledgement (ACK). Typical notification of ACKs involves giving a notification of a sequence number added to a PDU that was successfully received, and then giving a notification of the successful reception of the PDU with the corresponding sequence number to a transmitting station.

In this manner, in the case of a control signal for a retransmission request, the specific content thereof has variations such as ACK-based or NACK-based control information, and notifications can be performed using a bitmap marked with "1" for successful reception and "0" for a code error in addition to marking a sequence number directly in the bit sequence. Because the essence of the present invention is completely independent of a method of marking such retransmission request information, description has been provided exemplifying the case in which an NACK is returned, but the present invention is also applicable to a system that employs any other retransmission request signal.

In addition, as an example of signal processing performed when a receiving station receives a signal and a PDU transmitted by a transmitting station is reproduced from the received signal, single carrier transmission for performing frequency domain equalization processing (SC-FDE) will be described. There are several variations in SC-FDE, and there is generally a technique to avoid inter-block interference caused by delay waves by adding a copy of part of the front half portion of a block region which is commonly called a cyclic prefix to an end of a block region for each predetermined block region. In addition, there is also a scheme called Overlap-FDE technology for single carrier transmissions in which no cyclic prefix is added. Here, description will be provided exemplifying the Overlap-FDE technology.

First, except when a training signal for channel estimation in the frequency domain is added to a transmitted signal, a signal subsequent thereto is a signal of normal single carrier transmission, Here, if frequency domain equalization processing is to be performed, channel estimation needs to be performed in advance. Specifically, a predetermined band is divided into NFFT frequency components, and channel information corresponding to each frequency component is assumed to have been acquired.

Next, processing of the Overlap-FDE on a reception side will be described. The reception side reads sampling data (NFFT samples) of a predetermined block region, and decomposes into the signal of the frequency component using FFT processing of NFFT points. The reception side divides the decomposed signal of the frequency component by the channel information for each frequency component estimated with a channel estimation signal in advance and compensates for frequency selectivity distortion in the frequency domain. The reception side transforms the compensated signal on the frequency axis into a signal in the time domain again using IFFT processing. In Overlap-FDE without a cyclic prefix, an inter-block interference signal is included in the region of a first quarter of the block region and the region of a last quarter of the block region. Thus, the reception side takes out only a time domain signal in half of the domain in the middle as valid information, and in a form in which Overlap-FDE processing is performed in an overlapping manner by offsetting by ½ cycles, combines sampling data equalized and reproduced in the effective frequency domain for a ½ cycle in the middle, and then reproduces a signal for single carrier transmission that has undergone frequency domain equalization processing. The reception side performs signal detection processing on the reproduced signal, thereby allowing signal detection processing with the frequency selectivity distortion compensated.

Although the above Overlap-FDE processing is an example, it is basically possible, as the biggest characteristic, to realize signal detection processing for single carrier transmission even when the frequency domain equalization processing is not performed. However, performing the frequency domain equalization processing tends to exhibit a low PDU error rate, and conversely, simple single carrier signal detection processing without equalization processing tends to exhibit a higher PDU error rate. Therefore, in the related art, in a case in which a PDU error is unavoidable even if the PDU error rate is improved as much as possible, improvement in the error rate by making a retransmission request for retransmission has been attempted.

FIG. 7 is a diagram illustrating a flowchart of processing during reception of a signal of a receiving station performing retransmission control in the related art. The receiving station starts processing (step S201), receives a PDU (step S202), and performs frequency domain equalization processing on the received sampling data using Overlap-FDE processing or the like (step S203). The receiving station performs signal detection processing (including error correction processing) of a single carrier (SC) on the received sampling data for which the frequency selectivity distortion has been compensated using the frequency domain equalization processing (step S204), and then detects the presence or absence of a code error in units of PDUs (step S205). If there is no code error in the PDU (step S206: NO), the receiving station enqueues the PDU in a reception buffer (step S207), and terminates the processing (step S210). If there is a code error in the PDU (step S206: YES), the receiving station discards the PDU (step S208), makes a retransmission request to the transmitting station (step S209), and terminates the processing (step S210).

FIG. 8 is a diagram illustrating a flowchart of processing during reception of control information of a transmitting station in the related art. When processing starts (step S211), the transmitting station receives control information (step S212), and performs frequency domain equalization processing on the received control information in the same manner as in the case of the PDU using Overlap-FDE processing or the like (step S213). The transmitting station performs signal detection processing (including error correction processing) of a single carrier (SC) on the received sampling data of the control information for which the frequency selectivity distortion has been compensated through the frequency domain equalization processing (step S214), and then detects whether there is a code error (step S215). If there is no code error in the control information (step S216: NO), the transmitting station analyzes the contents of the control information, performs retransmission processing as necessary (step S217), and terminates the processing (step S219).

If there is a code error in the control information (step S216: YES), the transmitting station discards the control information (step S218) and terminates the processing (step S219).

The receiving station repeatedly performs signal processing of the receiving station described above when a retransmitted PDU is received (or even when a new PDU is received). Thus, a PDU that has been lost due to the code error is also reproduced and output. Although not specified here, the receiving station sorts successfully received PDUs at a predetermined timing and outputs the data so as to reproduce the data in the same order in which it is input to the transmitting station side.

In general, transmission and reception of signals are delayed due to processing delays, propagation delays, etc. For example, in a case in which retransmission control is involved in signal transmission in a direction from a base station apparatus to a terminal station apparatus, the following processing delay is required.

First, in order for a target PDU to be successfully received by the terminal station apparatus, the base station apparatus needs to perform predetermined modulation processing on transmission data, convert the signal into a radio frequency, and transmit the signal, and the terminal station apparatus needs to convert the frequency of the received signal, sample the signal, and perform frequency domain equalization processing, signal detection processing, error detection processing, and the like on the sampled signal. This operation corresponds to one-way signal transmission in the direction from the base station apparatus to the terminal station apparatus.

Here, in a case in which a retransmission request is made, the terminal station apparatus generates control information for the retransmission request, performs predetermined modulation processing on the information, converts the signal into a radio frequency, and transmits the signal. The base station apparatus receives the control information, converts the frequency of the received signal, samples the signal, and performs frequency domain equalization processing, signal detection processing, error detection processing, and the like on the sampled signal. Furthermore, the base station apparatus recognizes the necessity for retransmission of the PDU based on the retransmission request signal, selectively reads the data of the PDU, performs predetermined modulation processing on the transmission data, converts the signal into a radio frequency, and transmits the signal. The terminal station apparatus converts the frequency of the received signal, samples the signal, and performs frequency domain equalization processing, signal detection processing, error detection processing, and the like on the sampled signal.

As a result, in comparison to a case in which reception is successful in a single operation, one and a half round trips, i.e., a 3 times the delay time of a simple calculation, are needed. Each time one retransmission operation is added, a processing delay for one round trip is added, and a total processing delay determines overall delay characteristics.

In this way, a very long delay time is required for performing retransmission control in comparison to a case without retransmission control. However, because there are recent applications requiring very short delay times, it is difficult to ensure a processing delay time for retransmission.

CITATION LIST

Non Patent Literature

Non-Patent Literature 1: Tatsunori Obara, Ichizu Takeda, Fumiyuki Adachi "Comparison of Characteristics of Overlap FDE and Inter-block Interference Canceller (シングルキャリア伝送におけるOverlap FDE とブロック間干渉キャンセラの特性比較)," Institute of Electronics, Information and Communication Engineers, Technology Report, vol. 110, no. 433, RCS2010-252, p. 25 to 29, 2011

SUMMARY OF THE INVENTION

Technical Problem

As described above, 5G has very strict required conditions for delay times, and even radio parts obtained by making part of an entrance circuit into a radio circuit and the access system are required to have compatible conditions of reducing a delay resulting from radio transmission on one hand and achieving high quality in spite of error rates on the other hand. With respect to processing delays, while an error rate is improved if signal processing is enhanced to improve the error rate, the processing delay increases. For example, taking the Overlap-FDE technique as an example, while the processing delay is only required to be the shortest without performing equalization processing as processing of the reception side, the error rate characteristics deteriorate. On the other hand, performing the equalization processing improves the error rate but deteriorates the processing delay. Similarly, if retransmission control is performed at the time of error detection, the error rate characteristics are improved, but the processing delay the processing delay $T_{1way}$ without retransmission control is increased by $2 \times T_{1way}$ with every retransmission.

Taking the above-described circumstances into consideration, an objective of the present invention is to provide a retransmission control method that enables retransmission to be completed with a shorter delay time while ensuring quality of radio communication.

Means for Solving the Problem

An aspect of the present invention is a retransmission control method for a radio communication system including a first radio station and a second radio station, the retransmission control method including, at the first radio station, transmitting user data via radio to the second radio station, the user data being accommodated in a radio packet for user data; and in response to a retransmission request from the second radio station, retransmitting the radio packet for user data; and at the second radio station, receiving, via radio, the radio packet for user data transmitted in the transmitting or the retransmitting; performing first signal detection processing on a radio signal received in the receiving; performing first code error detection processing on the radio packet for user data detected in the first signal detection processing; in a case in which a code error is detected in the first code error detection, making a retransmission request for the radio packet for user data to the first radio station; in a case in which a code error is not detected in the first code error detection, performing first enqueuing of the radio packet for user data in a reception buffer; performing second signal detection processing on the radio signal received in the receiving with a longer processing delay than a processing delay of the first signal detection processing; performing second code error detection processing on the radio packet for user data detected in the second signal detection processing; in a case in which a code error is not detected in the second code error detection, performing second enqueuing of the radio packet for user data in the reception buffer; and outputting, at a predetermined timing, the radio packet for user data with no code error detected, the radio packet being enqueued in the reception buffer.

An aspect of the present invention is the above-described retransmission control method, in which the second signal detection processing can have a lower error rate than the first signal detection processing.

An aspect of the present invention is the above-described retransmission control method, in which the first signal detection processing is single carrier signal detection processing without frequency selectivity distortion compensation, and the second signal detection processing is single carrier signal detection processing with frequency selectivity distortion compensation.

An aspect of the present invention is the above-described retransmission control method in which the first signal detection processing is signal detection processing without phase noise compensation, and the second signal detection processing is signal detection processing with phase noise compensation.

An aspect of the present invention is the above-described retransmission control method in which the first signal detection processing is signal detection processing without hybrid Automatic Repeat Request (ARQ) processing, and the second signal detection processing is signal detection processing with hybrid ARQ processing.

An aspect of the present invention is the above-described retransmission control method further including, at the first radio station, performing third signal detection processing to perform signal detection on a radio signal received from the second radio station, the third signal detection not including signal processing for improving an error rate, and to detect the retransmission request.

An aspect of the present invention is a retransmission control method at a radio station, the retransmission control method including receiving, via radio, a radio packet for user data accommodating user data or the radio packet for user data retransmitted in response to a retransmission request; performing first signal detection processing on a radio signal received in the receiving; performing first code error detection processing on the radio packet for user data detected in the first signal detection processing; in a case in which a code error is detected in the first code error detection, making a retransmission request to a transmission source of the radio packet for user data; in a case in which a code error is not detected in the first code error detection, performing first enqueuing of the radio packet for user data in a reception buffer; performing second signal detection processing on the radio signal received in the receiving with a longer processing delay than a processing delay of the first signal detection processing; performing second code error detection processing on the radio packet for user data detected in the second signal detection processing; in a case in which a code error is not detected in the second code error detection, performing second enqueuing of the radio packet for user data in the reception buffer; and outputting, at a predetermined timing, the radio packet for user data with no code error detected, the radio packet being enqueued in the reception buffer.

Effects of the Invention

The present invention enables retransmission to be completed with a shorter delay time while ensuring quality of radio communication.

BRIEF DESCRIPTION OF DRAWINGS

FIGS. 4A and 4B are timing charts of signal retransmission according to the embodiment and the related art.

DESCRIPTION OF EMBODIMENTS

Figure 1:
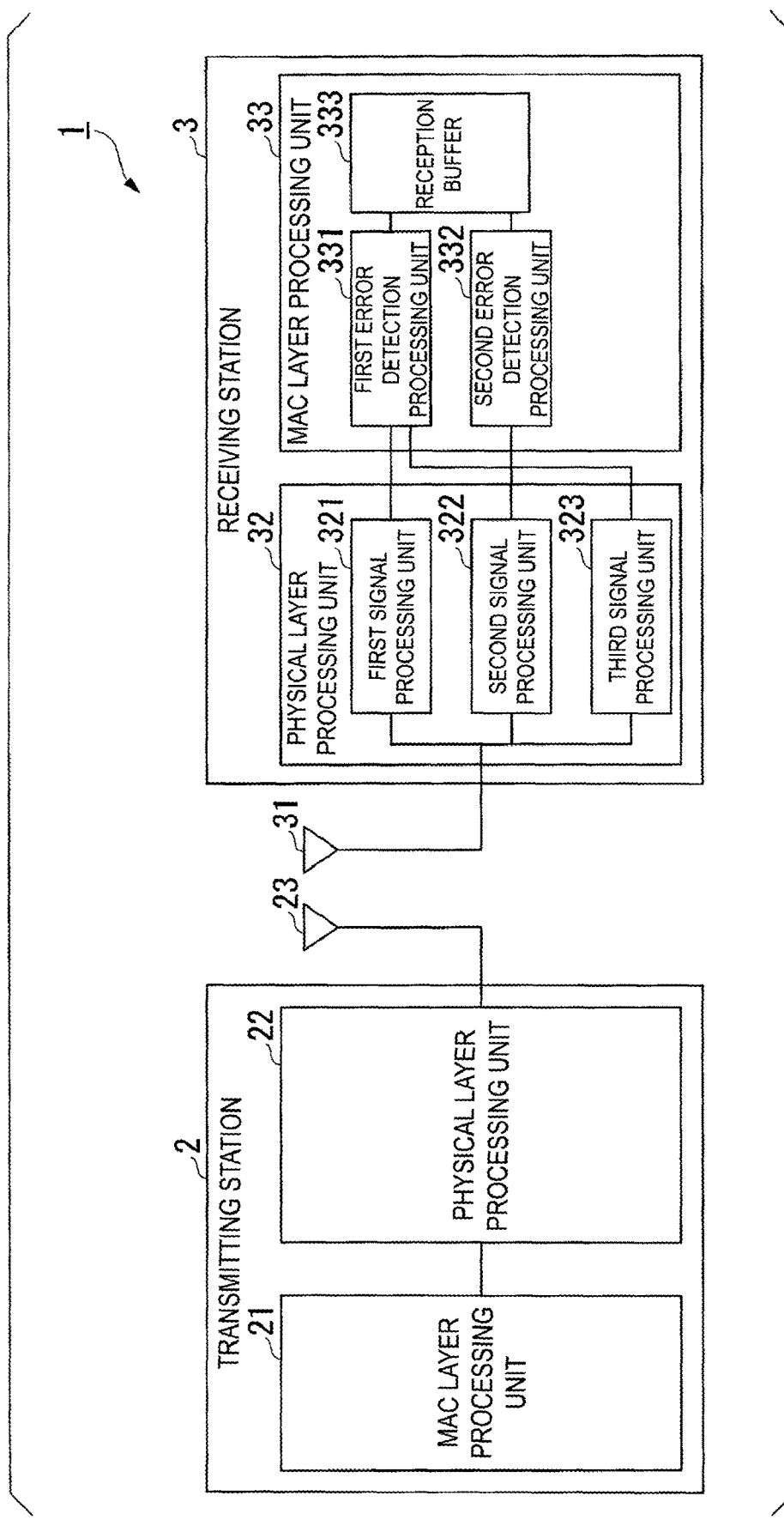
FIG. 1 is a configuration diagram of radio communication system according to a first embodiment.

Hereinafter, embodiments of the present invention will be described in detail with reference to the drawings.

Operation Principle

The operation principle according to the embodiments of the present invention will be described below.

Although briefly mentioned in the background art, taking a single carrier transmission case as an example, while signal detection processing can be performed using a received signal without change, it is alternatively possible to perform signal detection processing after performing frequency domain equalization processing. Taking the Overlap-FDE technology of single carrier transmission and the like as an example, except when a training signal for channel estimation in the frequency domain is added to a transmission signal. A signal subsequent thereto is a signal for normal single carrier transmission. If frequency selectivity distortion is limited, it may or may not be possible to successfully receive signals without performing frequency domain equalization processing depending on a situation. Of course, it is ideal to perform frequency domain equalization processing, but processing delays are required for frequency domain equalization processing. For example, with respect to the FFT processing performed when a time-domain signal is transformed into a frequency-domain signal, it is not possible to start the FFT processing unless reception of all data equivalent to one block region is finished.

Typically, a length of one block region, which is a processing unit for frequency domain equalization, is set sufficiently longer than an expected delay wave in order to eliminate the effects of the delay wave. It is not possible to proceed to the next FFT processing until sampling of the data for this time length is completed. On the other hand, in the case of single carrier transmission of the related art, the processing can be immediately started for each piece of sampling data once received signals are sampled. Likewise in the case of IFFT processing, a delay time resulting from signal processing in units of blocks as described above entails a much longer processing delay than that in simple single carrier signal detection processing. Here, if radio communication is performed over a relatively short distance, a propagation delay in the space is relatively short, and processing delays required for signal processing at the transmitting station and the receiving station affect the delay characteristics. Making a retransmission request in advance in a case with high likelihood of a retransmission request without waiting for such an excessive processing delay is the point of the present operation principle.

For example, when the application of the Overlap-FDE is assumed, single carrier signal detection processing is possible without performing frequency domain equalization processing on a received signal. Although it is essential to implement frequency domain equalization processing of Overlap-FDE to improve error rate characteristics, in the present embodiment, single carrier signal detection processing of the related art without frequency domain equalization processing is also performed in parallel. In a case in which reflection waves have limited influence in a probable environment, a certain degree of PDU error rate can be expected even if no frequency domain equalization processing is performed. In Overlap-FDE processing, FFT processing, division processing of channel information for each frequency component, IFFT processing, and further processing of combining sampling data in a patch shape need to be performed, and thus processing delays of the processing deteriorate overall delay characteristics. Therefore, in a case in which simple single carrier transmission signal detection processing avoiding such processing concurrently is performed and there is a code error, the above-described frequency domain equalization processing is performed in parallel with a retransmission request while a retransmission request is made in advance before the presence or absence of code errors in the true sense is confirmed through the frequency domain equalization processing.

As described above, in the case in which retransmission control is performed, a delay required for a single round-trip signal transmission is needed for the delay required for one-way signal transmission without retransmission, and a delay time required for one round-trip signal transmission, which is the difference, is expected to be longer than a delay required for frequency domain equalization processing of Overlap-FDE. In the present embodiment, in a case in which a code error is detected in a PDU in single carrier transmission signal detection processing without frequency domain equalization processing of Overlap-FDE, a retransmission request is made at that time. On the other hand, if the normal data can then be reproduced through the frequency domain equalization processing after the request, PDUs are successfully received accordingly. In this case, without waiting for determination of whether a retransmitted PDU has been successfully received, transmission of the PDU is completed at that time point. Of course, in a case in which there is a code error even though frequency domain equalization processing is performed, it is better to wait for reception of the retransmitted signal for which a retransmission request has been made in advance. However, because the processing operations are performed concurrently, a delay time resulting in the retransmission control is consequently shortened.

It should be noted that the code error rates (e.g. Packet Error Rate (PER)) include cases in which frequency domain equalization processing is and is not performed. In a certain probable environment, a degree of frequency selectivity distortion is expected to be limiting. For example, the PER in the case in which frequency domain equalization processing is not performed is, for example, $10^{-2}$, and the PER in the case in which frequency domain equalization processing is performed is $10^{-4}$, for example. In this case, while the probability that retransmission is originally required is $10^{-4}$, in the present embodiment, a retransmission request is performed with a probability of $10^{-2}$. Thus, transmission efficiency decreases due to excessive retransmission requests, but in any case, loss in transmission efficiency resulting from useless retransmission is 0.99%, which is the difference between the frequency of retransmission 1% (i.e., probability $10^{-2}$) and 0.01% (i.e., probability $10^{-4}$). If this reduction in transmission efficiency is acceptable, a significant reduction in processing delay can be achieved due to a limited transmission efficiency reduction attributable to such a retransmission request made in advance.

Further, for example, a one-way transmission delay, specifically, a one-way transmission delay corresponding to "a processing delay from the generation of a PDU at a transmitting station to transmission processing, a propagation delay on a channel, reception processing of a PDU at a receiving station," or "a processing delay from generation of control information for a retransmission request at the receiving station to transmission processing, a propagation delay on a channel, reception processing of the control information for the retransmission request at the transmitting station," and further similarly, "transmission processing from generation processing of the retransmitted PDU at the transmitting station after the retransmission request is identified, in addition to a propagation delay of the retransmitted PDU, and reception processing of the retransmitted PDU at the receiving station," and the like is $T_1$. Moreover, the gap between the processing delay times of "PDU reception processing at the receiving station or the transmitting station without frequency domain equalization processing" and "PDU reception processing at the receiving station or the transmitting station with frequency domain equalization processing" is denoted by $\Delta T$. A processing delay of approximately $2T_1$ is required until the receiving station receives the retransmitted PDU and the reception processing of the PDU is completed without frequency domain equalization processing from a retransmission request made by the receiving station, $\Delta T < 2T_1$ is generally expected as described above. Assuming that $\Delta t = T_1$, in the receiving station, the error rate $T_1$ later after the transmitting station starts transmission is $10^{-2}$, the error rate $2T_1$ later is $10^{-4}$ (including improvement in the frequency domain equalization process), the error rate $3T_1$ later is $10^{-6}$ (with the probability of the result obtained by multiplying the error rate $2T_1$ later and an independent error rate by $10^{-2}$), and the error rate $4T_1$ later is $10^{-8}$ (including improvement in frequency domain equalization processing). If a retransmission request is performed after performing frequency domain equalization processing, the one-way transmission delay is $2T_1$, and thus the processing delay required for the two PDU transmission operations (corresponding to one retransmission operation) is $6T_1$, so the delay time required to achieve the error rate $10^{-8}$ due to the application of the present embodiment can be shortened from $6T_1$ to $4T_1$. As the number of retransmission operations increases, the difference increases further.

The above description is for the operation principle of an embodiment of the present invention, and detailed processing will be described below. Note that, as described in the background, although there are various variations in control signals for the retransmission requests, the nature of the present invention is completely independent of the indication method of retransmission request information that is notified of using control signals from the receiving station to the transmitting station. Although a case in which an NACK is returned will be exemplified below, the present embodiment is also adaptable to a system that employs any other retransmission request signal.

First Embodiment

FIG. 1 is a functional block diagram illustrating a configuration of a radio communication system 1 according to a first embodiment of the present invention, showing only functional blocks associated with the present embodiment. The radio communication system 1 includes a transmitting station 2 and a receiving station 3. The transmitting station 2 is a radio station on a user data transmission side. The receiving station 3 is a radio station on a user data reception side. In the same drawing, although one each of the transmitting station 2 and the receiving station 3 is illustrated, the number of each station is optional.

The transmitting station 2 includes a Medium Access Control (MAC) layer processing unit 21, a physical layer processing unit 22, and an antenna 23. The MAC layer processing unit 21 performs processing for the MAC layer (layer). The MAC layer processing unit 21 performs conversion processing or termination processing between a frame format used for transmission and reception in a radio communication section and a frame format used for transmission and reception on an external apparatus or a network, which are not illustrated. The MAC layer processing unit 21 configures a PDU having a sequence number as a radio packet for user data configured with the user data, and outputs the configured PDU to the physical layer processing unit 22. In addition, in a case in which the MAC layer processing unit 21 determines that retransmission of the radio packet for user data is necessary based on the control information configured in the control information radio packet received from the receiving station 3, the MAC layer processing unit 21 outputs the radio packet for user data to be retransmitted to the physical layer processing unit 22.

The physical layer processing unit 22 performs signal processing on the physical layer. The physical layer processing unit 22 converts a radio packet for new or retransmitted user data output from the MAC layer processing unit 21 into a single carrier radio signal and transmits the radio signal from the antenna 23. In addition, the physical layer processing unit 22 performs signal detection processing on a radio signal received by the antenna 23 and outputs the detected signal to the MAC layer processing unit 21. For example, the physical layer processing unit 22 detects a radio packet for control information transmitted by the receiving station 3 from the radio signal received by the antenna 23 and outputs the detected packet to the MAC layer processing unit 21.

The receiving station 3 includes an antenna 31, a physical layer processing unit 32, and an MAC layer processing unit 33. The physical layer processing unit 32 performs signal processing on the physical layer. The physical layer processing unit 32 detects a signal transmitted by the transmitting station 2 from a radio signal received by the antenna 23 and outputs the signal to the MAC layer processing unit 33. In addition, the physical layer processing unit 32 converts a signal output from the MAC layer processing unit 33 into a radio signal and transmits the signal via radio from the antenna 31. The physical layer processing unit 32 includes a first signal processing unit 321, a second signal processing unit 322, and a third signal processing unit 323.

The first signal processing unit 321 performs first signal detection processing on the radio signal received by the antenna 31 to detect a PDU that is a radio packet for user data. In parallel with the first signal processing unit 321, the second signal processing unit 322 performs second signal detection processing on the radio signal received by the antenna 31 and detects a PDU that is a radio packet for user data. The first signal detection processing does not include signal processing for improving an error rate (equalization processing), and the signal processing is completed at a faster rate in a shorter time in comparison to the second signal detection processing that includes signal processing for improving an error rate (equalization processing). The third signal processing unit converts a radio packet for control information output from the MAC layer processing unit 33 into a single carrier radio signal and transmits the radio signal from the antenna 31.

The MAC layer processing unit 33 performs processing on the MAC layer. The MAC layer processing unit 33 performs conversion processing or termination processing between a frame format of a radio packet for user data used for transmission and reception in a radio communication section and a frame format used for transmission and reception on an external apparatus or a network, which are not illustrated. The MAC layer processing unit 33 includes a first error detection processing unit 331, a second error detection processing unit 332, a reception buffer 333, and, although not specified here, a function of controlling the constituents.

The first error detection processing unit 331 performs error detection processing on a PDU detected in first signal detection processing. When there is no error, the first error detection processing unit 331 enqueues the PDU in the reception buffer 333, and when there is an error, the first error detection processing unit 331 outputs a radio packet for control information set with a control signal requesting retransmission of the PDU to the third signal processing unit 323 of the physical layer processing unit 32. The second error detection processing unit 332 performs error detection processing on a PDU detected in second signal detection processing. The second error detection processing unit 332 enqueues the PDU in the reception buffer 333 when there is no error, and discards the PDU when there is an error. The MAC layer processing unit 33 arranges the PDUs enqueued in the reception buffers 333 in the same order as the transmission side at a predetermined timing and outputs the PDUs to a processing unit in the higher layer, which is not illustrated.

Figure 2:
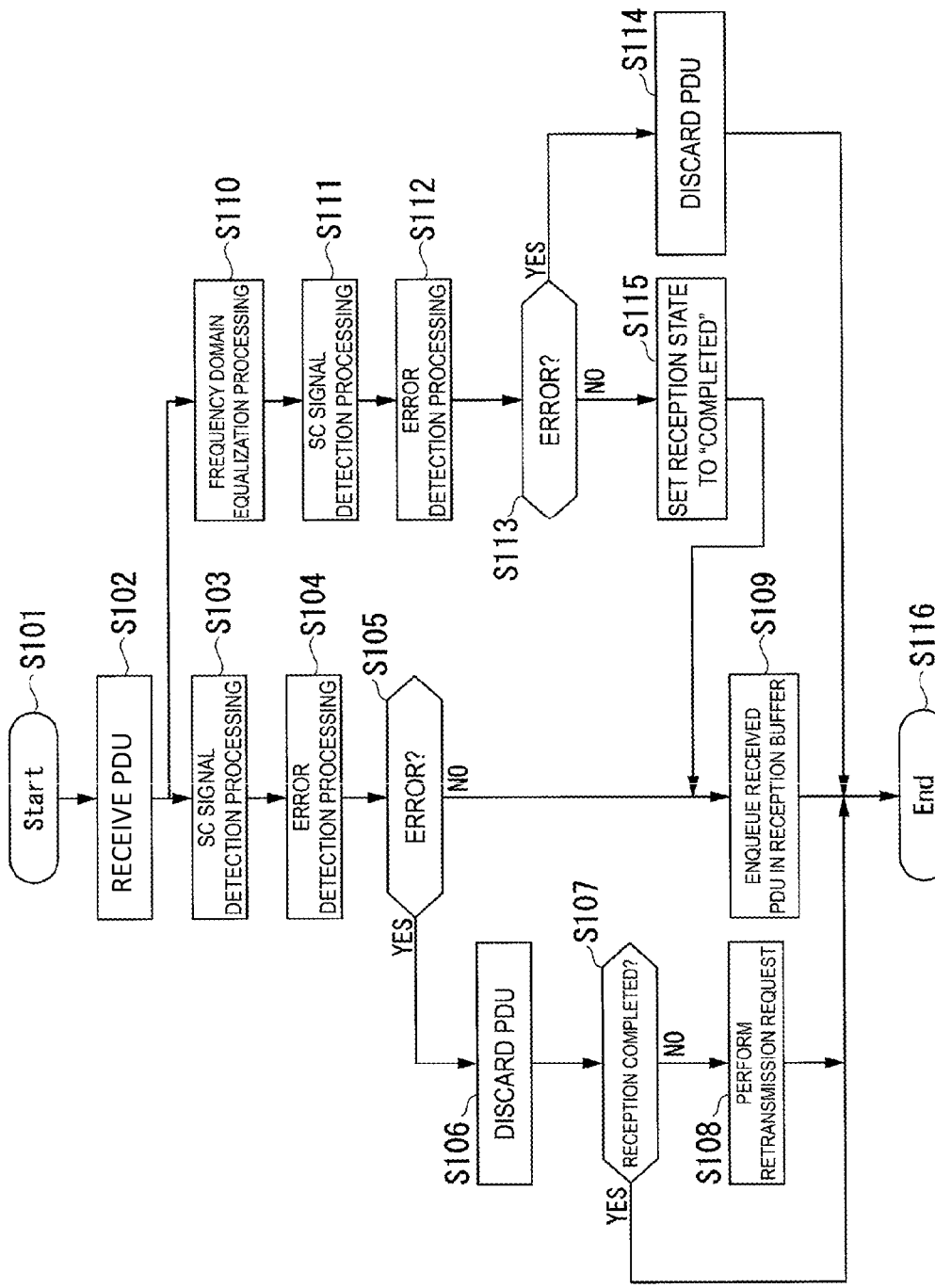
FIG. 2 is a diagram showing a flowchart of processing performed when a receiving station receives a signal according to the embodiment.

FIG. 2 shows a flowchart of processing performed when the receiving station 3 receives a signal according to a first embodiment. When the receiving station 3 starts processing (step S101) and the antenna 31 receives a PDU (step S102), the physical layer processing unit 32 performs the following two processing operations in parallel with the received sampling data. First, the first signal processing unit 321 of the physical layer processing unit 32 performs single carrier signal detection processing (including error correction processing) on the received sampling data as the first signal detection processing (step S103). In the signal detection processing, a signal transmitted from the transmitting station 2 is detected, and the data sequence is reproduced. Thereafter, the first error detection processing unit 331 detects whether there is a code error in units of PDUs (step S104).

If the first error detection processing unit 331 detects that there is no code error in the PDUs (step S105: NO), the first error detection processing unit 331 enqueues the received PDUs in the reception buffer 333 (step S109), and terminates the processing (step S116). If the first error detection processing unit 331 detects that there is a code error in a PDU (step S105: YES), the first error detection processing unit 331 discards the PDU (step S106) and checks whether the reception of the PDUs has already been completed (step S107). If the first error detection processing unit 331 determines that the reception has not been completed (step S107: NO), the first error detection processing unit 331 performs a retransmission request (step S108), and terminates the processing (step S116).

The second signal processing unit 322 of the physical layer processing unit 32 performs frequency domain equalization processing on the received sampling data as another second signal detection processing performed in parallel with the first signal detection process using Overlap-FDE processing or the like (step S110).

The second signal processing unit 322 performs single carrier signal detection processing (including error correction processing) on the received sampling data for which the frequency selectivity distortion has been compensated through the frequency domain equalization processing (step S111), and then the second error detection processing unit 332 detects the presence or absence of code errors in units of PDUs (step S112).

If the second signal processing unit 322 detects that there is a code error in a corresponding PDU (step S113: YES), the second signal processing unit 322 discards the PDU (step S114). If the second signal processing unit 322 detects that there is no code error in the PDUs (step S113: NO), the second signal processing unit 322 sets the reception state of the PDUs as a "reception completed" state (step S115), and enqueues the PDUs in the reception buffer 333 (step S109), and terminates the processing (step S116).

Although not explicitly noted here, the transmitting station 2 retransmits a PDU for which a retransmission request has been made, and when the receiving station 3 receives the PDU (or although the same applies when a new PDU is received), the above-described processing illustrated in FIG. 2 is again performed to compensate for a PDU that is lost due to a code error. Furthermore, although not explicitly stated here, the receiving station 3 sorts successfully received PDUs enqueued in the reception buffer 333 at a predetermined timing, and outputs the data in the same order as the order input to the transmitting station 2 side so that it can be reproduced. Processing similar to that of a conventional receiving station can be used for the above operation.

Figure 8:
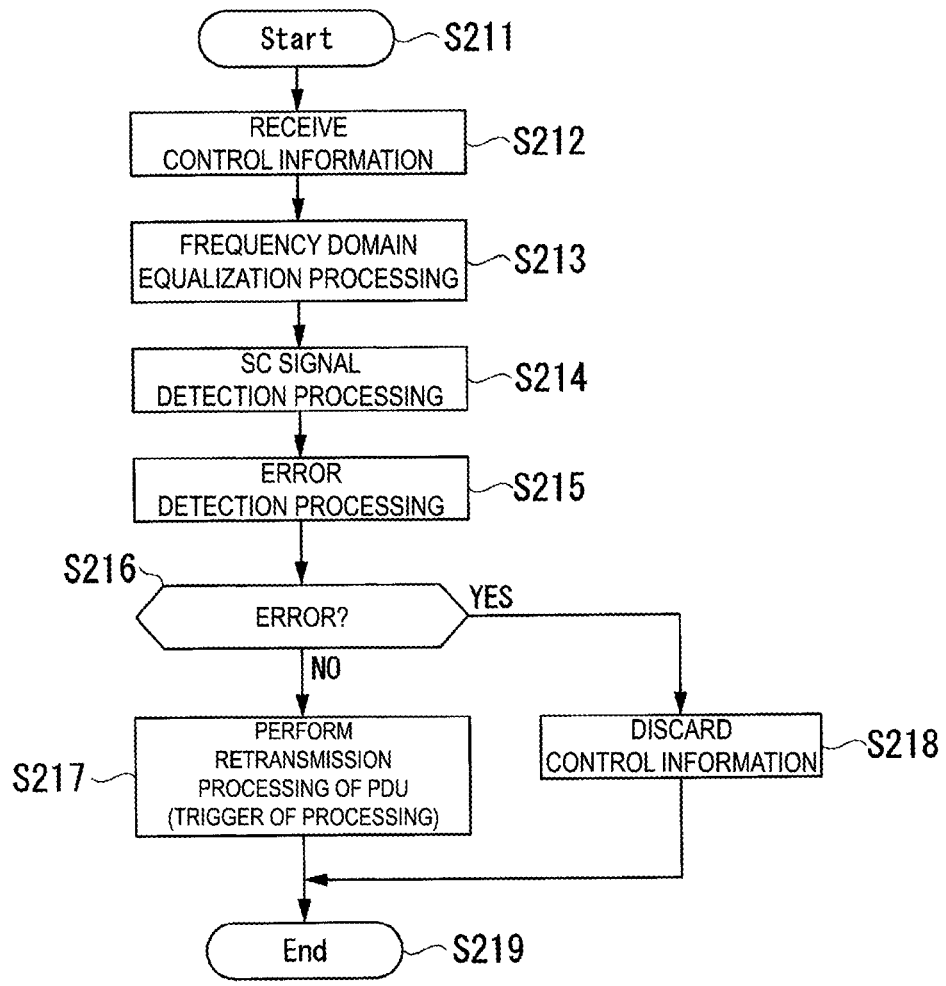
FIG. 8 is a diagram showing a flowchart of processing performed when a transmitting station receives control information in the related art.

On the other hand, although the flowchart of the processing performed when the transmitting station 2 receives the retransmission request may be similar to that illustrated in FIG. 8, a configuration in which the frequency domain equalization processing is omitted may be applied. Because an amount of control information is significantly less than an amount of user data in general, efficiency in transmission of control information does not easily deteriorate even if a high reliability mode with a low transmission rate is applied to the control information, and thus such omission of the frequency domain equalization processing is fully selectable.

Figure 3:
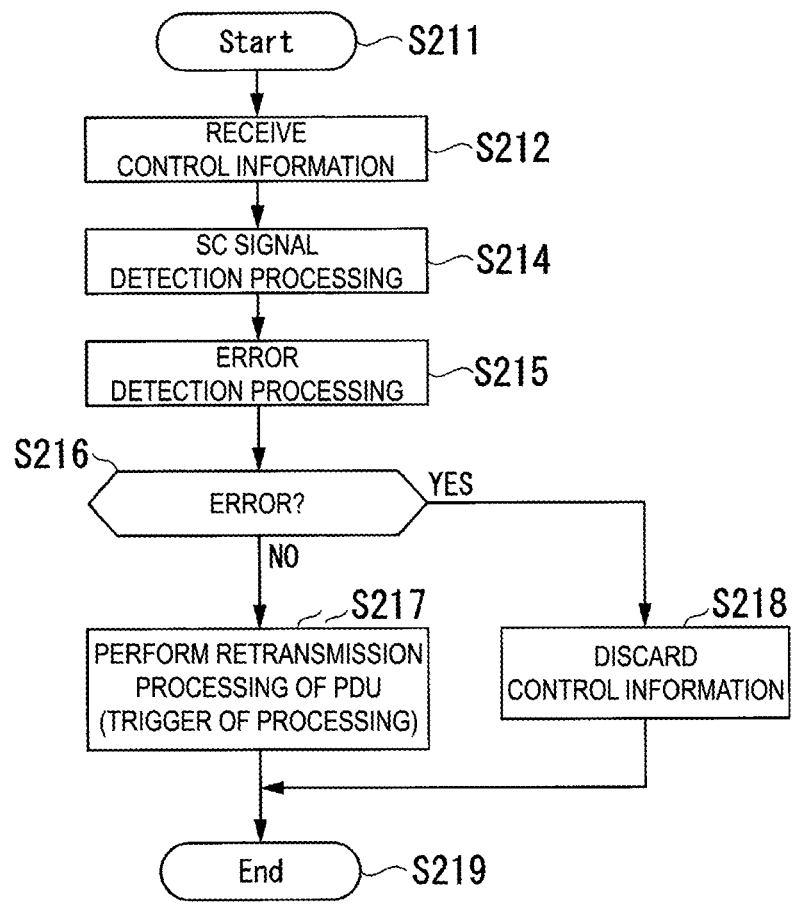
FIG. 3 is a diagram showing a flowchart of processing performed when a transmitting station receives control information according to the embodiment.

FIG. 3 is a diagram showing a flowchart of processing performed when the transmitting station 2 receives control information according to the present embodiment. When the transmitting station 2 starts processing (step S211), the antenna 23 receives control information via radio (step S212). The physical layer processing unit 22 performs single carrier signal detection processing (including error correction processing) on the received sampling data of the control information (step S214). Subsequently, the MAC layer processing unit 21 detects whether there is a code error in the control information detected through signal detection processing (step S215). If the MAC layer processing unit 21 detects that there is no code error in the control information (step S216: NO), the MAC layer processing unit 21 analyzes the contents of the control information and performs PDU retransmission processing if necessary (step S217), and terminates the processing (step S219). If the MAC layer processing unit 21 detects that there is a code error in the control information (step S216: YES), the MAC layer processing unit 21 discards the control information (step S218) and terminates the processing (step S219). The difference from FIG. 8 is that step S213 is omitted in order to reduce a processing delay, and is a common process in other respects.

Note that the first signal processing unit 321 and the second signal processing unit 322 of the receiving station 3 may be physically separate circuits, and physically the same circuit may be used as long as the timings of the processing of step S103 of the first signal detection processing and the timing of step S111 of the second signal detection processing do not overlap. However, the processing of step S103 for the same PDU is performed prior to the processing of step S111. Likewise, the first error detection processing unit 331 and the second error detection processing unit 332 of the receiving station 3 may be physically separate circuits, and physically the same circuit may be used as long as the timings of the processing do not overlap. In this case, processing of steps S104 to S109 for the same received PDU is prioritized over processing of steps S112 to S114. In addition, the MAC layer processing units 21 and 33 may not perform error detection processing, and the physical layer processing unit 22, the first signal processing unit 321, and the second signal processing unit 322 may perform error detection processing.

FIGS. 4A and 4B show timing charts of signal retransmission according to the first embodiment and the related art. FIG. 4A shows retransmission request processing according to the related art, and FIG. 4B shows retransmission request processing according to the first embodiment.

In FIG. 4B, the processing illustrated in FIG. 2 is performed by the receiving station 3, and the processing illustrated in FIG. 3 is performed by the transmitting station 2. Furthermore, the second signal detection processing by the receiving station 3 is the same as signal detection processing of the related art.

For example, it is assumed that a processing delay in the first signal detection processing by the receiving station 3 is 10 μs and an error rate is 1%, and a processing delay in the second signal detection processing is 25 μs and an error rate is 0.01%. Moreover, it takes 5 μs for each of the transmitting station 2 and the receiving station 3 to perform transmission processing. In this case, in the first signal detection processing, there is a delay of 15 μs in one-way transmission, 30 μs in round-trip transmission, and in the second signal detection processing, there is a delay of 30 μs in one-way transmission and 60 μs in round-trip transmission.

In the related art, when a signal transmission timing from the transmitting station is set to t=0 μs, the receiving station receives a PDU (1) 5 μs later as illustrated in FIG. 4A, and if an error is detected after performing signal detection processing, the receiving station starts transmission processing of a retransmission request (2) in 30 μs after the processing delay of 25 μs has elapsed. The transmitting station receives the retransmission request (2) 5 μs later, which is in 35 μs. The transmitting station performs signal detection processing, and starts retransmission processing of a PDU (3) in 60 μs after the processing delay of 25 μs has elapsed. The receiving station receives the PDU (3) in 65 μs and if signal detection processing is performed and an error is detected again, the receiving station starts transmission processing of a retransmission request (4) in 90 μs. The transmitting station receives the retransmission request (4) in 95 μs. The transmitting station performs signal detection processing, and starts retransmission processing of a PDU (5) in 120 μs. The receiving station receives the PDU (5) in 125 μs and performs signal detection processing. If no errors are detected, the receiving station can successfully receive the PDU (5) in 150 μs. If an error is detected, the receiving station starts transmission processing of a retransmission request (6) in 150 μs (in the case of finite retransmission, there may be no retransmission request).

On the other hand, in the radio communication system 1 of the present embodiment, if a signal transmission timing from the transmitting station 2 is set to t=0 μs, the receiving station 3 receives a PDU (1) in 5 μs as illustrated in FIG. 4B. In a case in which an error is detected by performing the first signal detection processing, the receiving station 3 starts transmission processing of a retransmission request (2) in the 15 μs after a processing delay of 10 μs has elapsed. The transmitting station 2 receives the retransmission request (2) 5 μs later, which is in 20 μs. The receiving station 3 performs second signal detection processing on the PDU (1) in parallel with the first signal detection processing, and detects an error in 30 μs after a processing delay of 25 μs has elapsed from t=5 μs. The transmitting station 2 performs the signal detection processing of the retransmission request (2), and starts retransmission processing of a PDU (3) in 30 μs after a processing delay of 10 μs has elapsed from t=20 μs.

The receiving station 3 receives the PDU (3) in 35 μs and, in a case in which an error is detected by performing the first signal detection processing, the receiving station 3 starts transmission processing of a retransmission request (4) in 45 μs after a processing delay of 10 μs has elapsed. The transmitting station 2 receives the retransmission request (4) in 50 μs. The receiving station 3 performs the second signal detection processing on the PDU (3) in parallel with the first signal detection processing, and detects an error in 60 μs after a processing delay of 25 μs has elapsed from t=35 μs. The transmitting station 2 performs the signal detection processing of the retransmission request (4), and starts retransmission processing of a PDU (5) in 60 μs.

The receiving station 3 receives the PDU (5) in 65 μs, and in a case in which an error is detected by performing the first signal detection processing, the receiving station 3 starts transmission processing of a retransmission request (6) in 75 μs (in a case of finite retransmission, there may be no retransmission request). In parallel with the first signal detection processing, the receiving station 3 performs the second signal detection processing on the PDU (5), and if no errors are detected, the receiving station 3 can successfully receive the PDU (5) in 90 μs after a processing delay of 25 μs has elapsed from t=65 μs.

As described above, the time taken for the receiving station to successfully receive a PDU in two retransmission operations is 150 μs in the related art and 90 μs in the present embodiment. Although the band required for retransmission is 0.01% in the second signal detection processing, in the first signal detection processing, 1% of bands will be lost due to retransmission. However, instead of this loss, the retransmission cycles can be significantly shortened as described above and the retransmission delays can be significantly improved.

As described above, the radio communication system of the present embodiment has a first radio station and a second radio station. For example, the first radio station is the transmitting station 2 and the second radio station is the receiving station 3. The first radio station accommodates user data in a radio packet for user data and transmits the data to the second radio station. The second radio station detects whether there is a code error in the radio packet for user data received from the first radio station, accommodates information indicating the result of the presence of the code error in a radio packet for control information, and transmits the data to the first radio station. The first radio station retransmits the radio packet for user data as necessary based on the information accommodated in the radio packet for control information.

In such a radio communication system, the second radio station performs a first signal detection process with a short processing delay for the received radio signal. When detecting a code error in the radio packet for user data obtained by the first signal detection processing is detected, the second radio station makes a retransmission request for the radio packet for user data to the first radio station, and when no code errors are detected and data is successfully received, the second radio station enqueues the radio packet for user data in the reception buffer.

The second radio station performs the second signal detection processing on the received radio signal in parallel with the first signal detection processing. The second signal detection processing can have a longer processing delay and a lower error rate than the first signal detection processing. The second radio station detects whether there is a code error in the radio packet for user data obtained in the second signal detection processing, and when data is successfully received without errors, the second radio station enqueues the radio packet for user data in the reception buffer The second radio station performs compensation for the code error by outputting the successfully received radio packet for user data enqueued in the reception buffer at a predetermined timing.

According to the present embodiment, it is possible to make error rate characteristics and delay characteristics of the radio communication compatible and complete retransmission with a shorter delay time.

Second Embodiment

Although the example in which the frequency domain equalization processing is performed as the second signal detection processing is given in the description above, other signal processing may be performed. For example, although there are cases in which phase noise is problematic in a high frequency band, a phase noise compensation technique can be used instead of the frequency domain equalization processing. The details of the phase noise compensation processing will be briefly described because they do not affect the nature of the present embodiment. A sine wave signal (if a frequency component is referred to as a subcarrier, a single subcarrier around an end of a band is used, and an interval of a few subcarriers are placed between the single carrier and a subcarrier storing user data) is allocated with a slight frequency interval in part of the frequency domain (e.g., the end of a band used) separated from frequency components storing the user data. In this case, it is possible to estimate a behavior of phase noise in the time domain using the relationship between the channel information of the frequency components leaking around the sine wave signal and the frequency domain of the channel information of the sine wave as IFFT information. Due to this phase noise, each piece of sampling data causes some phase offset at each sampling timing in the time domain; however, if the phase offset value θ (t) is estimated for each sampling, the received sampling data is multiplied by Exp (−jθ(t)) by cancelling the estimated value, and thereby received sampling data with curbed phase noise is acquired. This phase noise compensation processing may be performed instead of the frequency domain equalization processing as the second signal detection processing.

Figure 5:
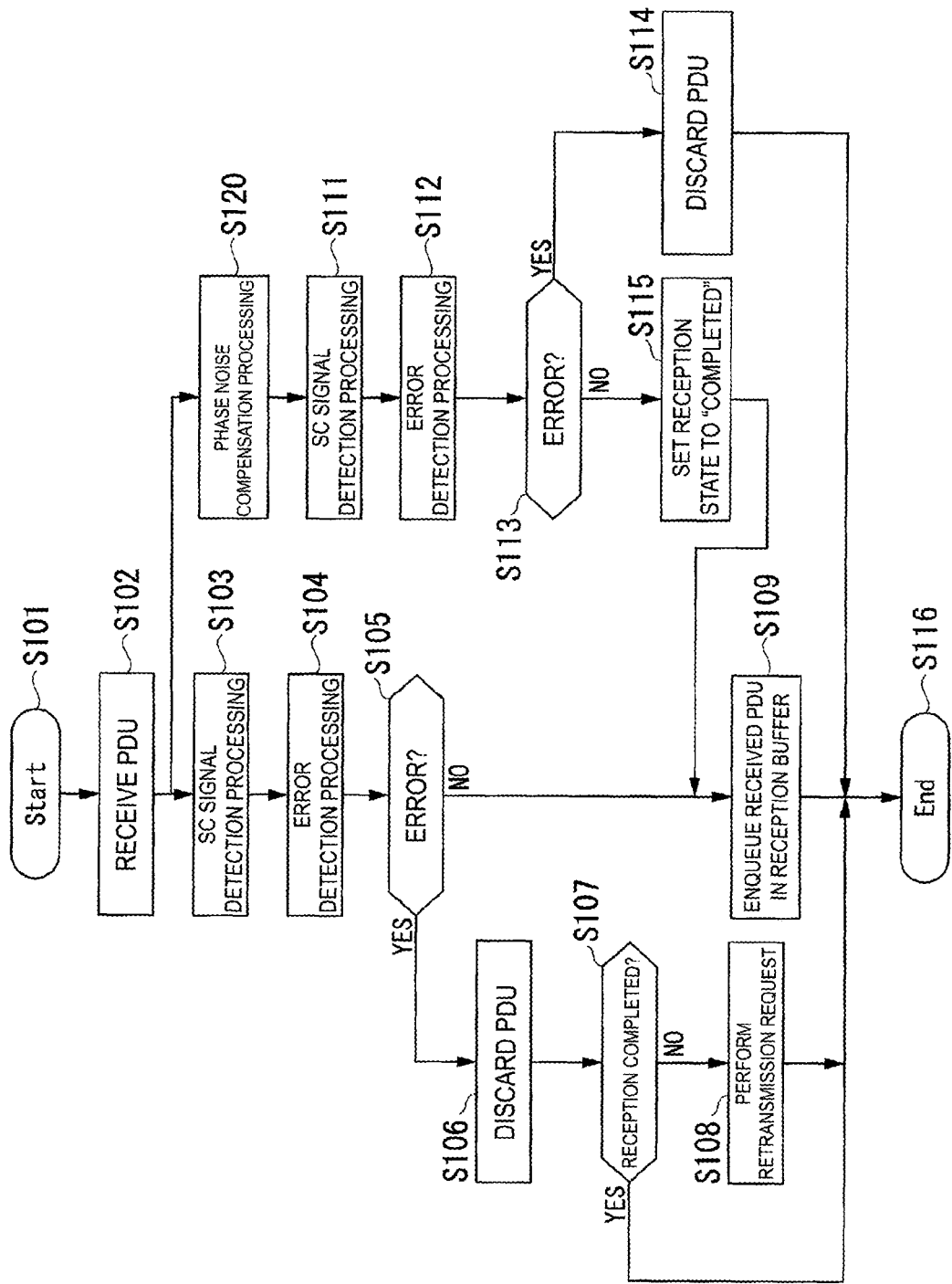
FIG. 5 is a diagram showing a flowchart of processing performed when a receiving station receives a signal according to a second embodiment.

FIG. 5 is a diagram showing a flowchart of processing performed when the receiving station 3 receives a signal according to a second embodiment. In the same drawing, processing identical to that of the receiving station 3 in the first embodiment illustrated in FIG. 2 is given the same reference signs, and description thereof will be omitted. The difference between the processing illustrated in FIG. 5 and the processing illustrated in FIG. 2 is that the processing of step S110 in FIG. 2 is replaced with phase noise compensation processing (step S120). As a result, two processing operations performed in parallel in the receiving station 3 are replaced with simple single carrier signal detection processing and single carrier signal detection processing performed after phase noise compensation. Processing other than the above is similar to that shown in FIG. 2.

Third Embodiment

In the above description, the receiving station performs all the same signal processing such as the frequency domain equalization process and the phase noise compensation processing without distinguishing a newly received PDU and a retransmitted PDU, however, the second signal detection processing may be performed only on the retransmitted PDU. Specifically, there is signal processing called Hybrid Automatic repeat-request (ARQ) as a signal processing technique to increase retransmission efficiency. In hybrid ARQ, it is common to combine sampling data of the retransmitted PDUs and the sampling data corresponding to the same PDU transmitted previously and perform signal detection processing. There may be various variations in the contents of the specific signal detection processing. However, what is apparently important is that, if performing signal detection processing simply on a retransmitted PDU is compared with combining previously received sampling data with sampling data of the latest retransmitted PDU and performing signal detection processing thereon, the latter requires more time for signal processing. In the present embodiment, in order to reduce the gap between the processing times, retransmission control is performed as necessary using only the result of simple signal detection processing of the retransmitted PDU.

Figure 6:
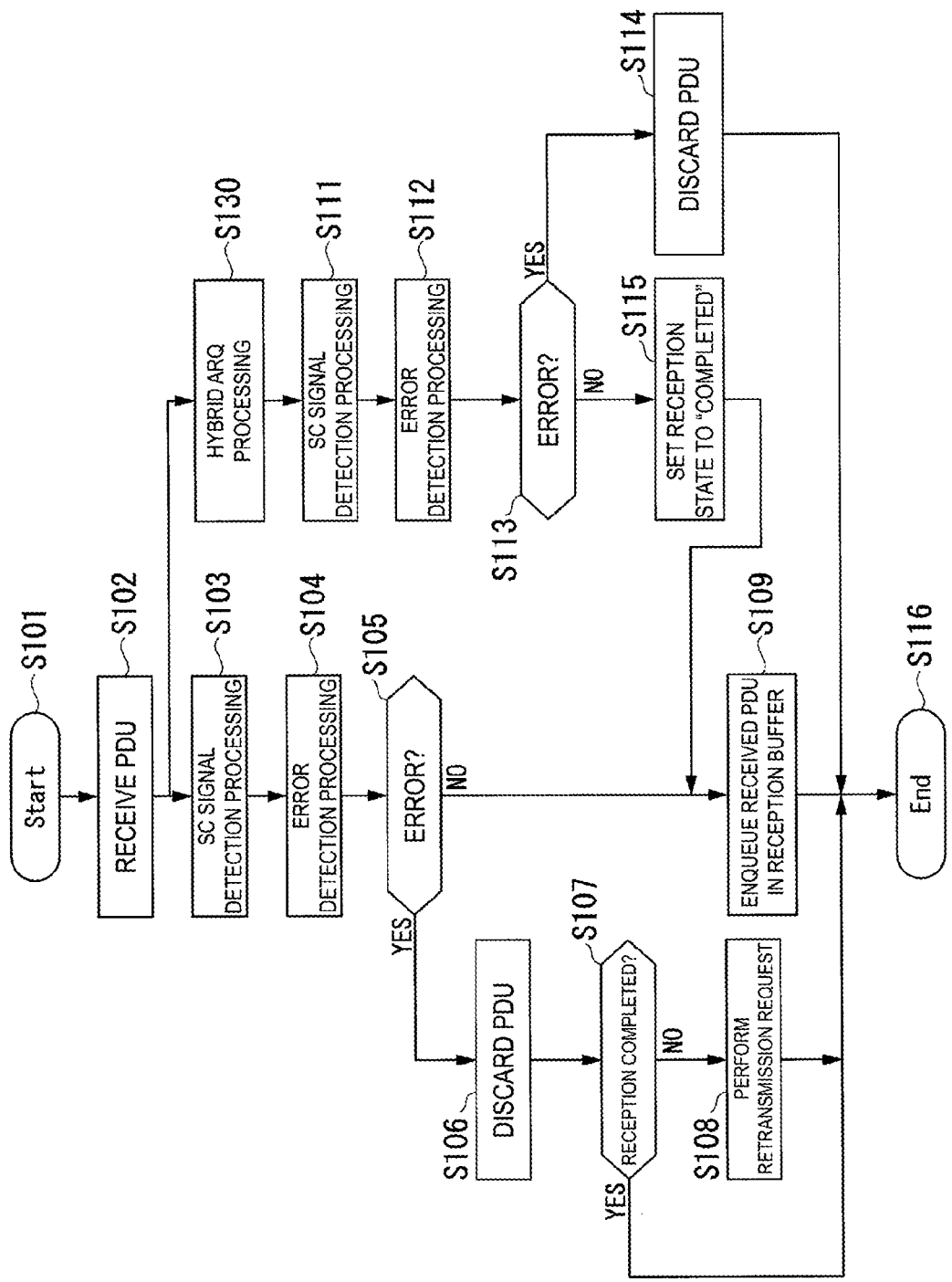
FIG. 6 is a diagram showing a flowchart of processing performed when a receiving station receives a signal according to a third embodiment.
Figure 7:
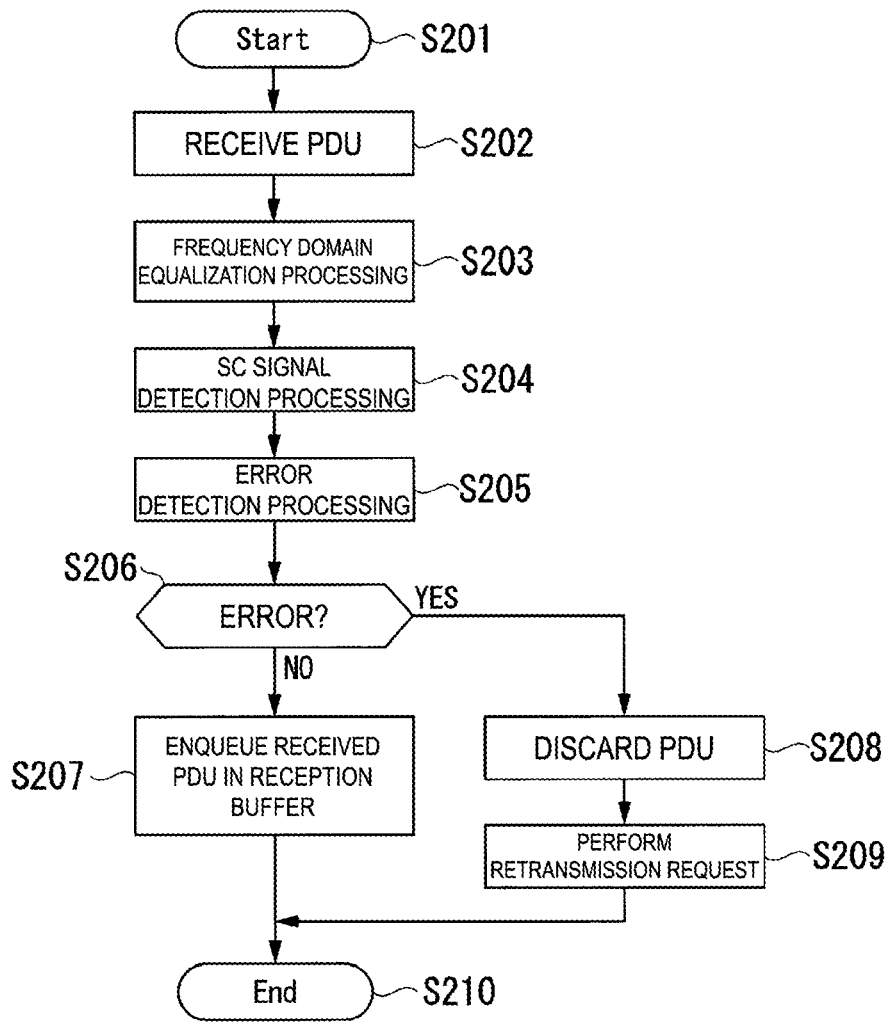
FIG. 7 is a diagram showing a flowchart of processing performed when a receiving station receives a signal in the related art.

FIG. 6 is a diagram showing a flowchart of processing performed when the receiving station 3 receives a signal according to a third embodiment. In the same drawing, processing identical to that of the receiving station 3 in the first embodiment illustrated in FIG. 2 is given the same reference signs, and description thereof will be omitted. The difference between the processing illustrated in FIG. 6 and the processing illustrated in FIG. 2 is that the processing of step S110 in FIG. 2 is replaced with hybrid ARQ processing (step S130). As a result, two processing operations performed in parallel in the receiving station 3 are replaced with simple single carrier signal detection processing and single carrier signal detection processing performed after hybrid ARQ processing. Processing other than the above is similar to that shown in FIG. 2.

Other Supplemental Description

Although the configurations in which the frequency domain equalization processing is performed in the first embodiment, the phase noise compensation processing is performed in the second embodiment, and hybrid ARQ processing is performed in the third embodiment in a single time have been described above, the processing of the embodiments is orthogonal processing, so signal processing in combination of each processing is also possible.

For example, in addition to performing normal single carrier signal detection processing as the first signal detection processing and performing the frequency domain equalization processing as the second signal detection processing, phase noise compensation processing may be performed as third signal processing, and these three kinds of signal processing can be performed concurrently. Furthermore, in addition to performing normal single carrier signal detection processing as the first signal detection processing, the phase noise compensation processing (pure phase noise compensation processing not including the single carrier signal detection processing) may be performed as the second signal detection processing, and the frequency domain equalization processing may be performed on the sampling data obtained as a result in the time domain. In this case, it is expected that error rate characteristics will be further improved because both phase noise and frequency domain equalization processing are applied. In this sense, in addition to performing the three kinds of signal processing concurrently as described above, it is also possible to further perform both phase noise and the frequency domain equalization processing concurrently as fourth signal processing.

Furthermore, hybrid ARQ processing may be combined further in the third embodiment of the present invention, and processing obtained by combining the presence or absence of these kinds of processing in a matrix is present as an option. Any of these kinds of processing may be performed.

Still further, other signal processing that contributes to the improvement of error rates that is not described herein may also be performed concurrently. In this case, the signal processing is incorporated into step S110 in the flowchart of the processing by the receiving station 3 of the first embodiment illustrated in FIG. 2.

There are a number of techniques for improving error rates even though the techniques entail processing delays. In the frequency domain equalization processing in single carrier transmission, division by CSI is performed after an FFT, and then an IFFT is performed. Additionally, in the phase noise compensation processing, a phase noise replica is generated from the signal leak information around the pilot signal after the FFT. For equalization, division by CSI is performed after an FFT, and then a IFFT is performed. Also, in hybrid ARQ, if there is an error in a retransmitted PDU, the PDU is combined with a previously received PDU to improve an SNR. Again, an error check is performed and successful reception is confirmed, then reception is completed. However, without performing such an error rate improvement technique, a radio station is capable of performing single carrier signal detection processing. Thus, in an embodiment of the present invention, a radio station that has received a signal performs a plurality of kinds of signal processing in parallel, receives the error detection result of the signal processing with the shortest processing delay, and makes a request for retransmissions in advance to the transmission source radio station.

Therefore, it is possible to achieve a radio transmission that shortens a time for retransmission control per cycle on one hand and enables improvement in an error rate after retransmission and a reduction in a processing delay while improving an error rate in radio transmission using retransmitting control.

Furthermore, although single carrier transmission assumed as the first signal detection processing has been described above, it is also possible, even in a case in which an OFDM modulation scheme is employed, for example, to apply only the normal OFDM modulation scheme as the first signal detection processing and apply phase noise compensation and hybrid ARQ as the second signal detection processing. Therefore, the embodiments of the present invention are widely applicable to general transmission schemes rather than a retransmission control technique limited to single carrier transmission.

Although the embodiments of the present invention have been described above with reference to the drawings, it is clear that the above embodiments are merely examples of the present invention, and the present invention is not limited to the embodiments described above. Thus, addition, omission, substitution, and other modifications of the constituent components may be made without departing from the spirit and scope of the present invention.

REFERENCE SIGNS LIST

1 Radio communication system
2 Transmitting station
3 Receiving station
21 MAC layer processing unit
22 Physical layer processing unit
23 Antenna
31 Antenna
32 Physical layer processing unit
33 MAC layer processing unit
321 First signal processing unit
322 Second signal processing unit
323 Third signal processing unit
331 First error detection processing unit
332 Second error detection processing unit
333 Reception buffer

The invention claimed is:

1. A retransmission control method for a radio communication system including a first radio station and a second radio station, the retransmission control method comprising:
at the first radio station,
transmitting user data via radio to the second radio station, the user data being accommodated in a radio packet for user data; and
in response to a retransmission request from the second radio station retransmitting the radio packet for user data; and
at the second radio station,
receiving, via radio, the radio packet for user data transmitted in the transmitting or the retransmitting;
performing first signal detection processing on a radio signal received in the receiving;
performing first code error detection processing on the radio packet for user data detected in the first signal detection processing;
in a case in which a code error is detected in the first code error detection, making a retransmission request for the radio packet for user data to the first radio station;
in a case in which a code error is not detected in the first code error detection, performing first enqueuing of the radio packet for user data in a reception buffer;
performing second signal detection processing on the radio signal received in the receiving with a longer processing delay than a processing delay of the first signal detection processing, wherein the second radio station performs the second signal detection processing in parallel with the first signal detection processing;
performing second code error detection processing on the radio packet for user data detected in the second signal detection processing;
in a case in which a code error is not detected in the second code error detection, performing second enqueuing of the radio packet for user data in the reception buffer; and
outputting, at a predetermined timing, one or more radio packets that are enqueued in the reception buffer.

2. The retransmission control method according to claim 1,
wherein the second signal detection processing is capable of reducing an error rate more than the first signal detection processing.

3. The retransmission control method according to claim 1,
wherein the first signal detection processing is single carrier signal detection processing without frequency selectivity distortion compensation, and
wherein the second signal detection processing is single carrier signal detection processing with frequency selectivity distortion compensation.

4. The retransmission control method according to claim 1,
wherein the first signal detection processing is signal detection processing without phase noise compensation, and
wherein the second signal detection processing is signal detection processing with phase noise compensation.

5. The retransmission control method according to claim 1,
wherein the first signal detection processing is signal detection processing without hybrid Automatic Repeat Request (ARQ) processing, and
wherein the second signal detection processing is signal detection processing with hybrid ARQ processing.

6. The retransmission control method according to claim 1, further comprising:
at the first radio station, performing third signal detection processing to perform signal detection on a radio signal received from the second radio station, the third signal detection not including signal processing for improving an error rate, and to detect the retransmission request.

7. A retransmission control method at a radio station, the retransmission control method comprising:
receiving, via radio, a radio packet for user data accommodating user data or the radio packet for user data retransmitted in response to a retransmission request;
performing first signal detection processing on a radio signal received in the receiving;
performing first code error detection processing on the radio packet for user data detected in the first signal detection processing;
in a case in which a code error is detected in the first code error detection, making a retransmission request to a transmission source of the radio packet for user data;
in a case in which a code error is not detected in the first code error detection, performing first enqueuing of the radio packet for user data in a reception buffer;
performing second signal detection processing on the radio signal received in the receiving with a longer processing delay than a processing delay of the first signal detection processing, wherein the radio station performs the second signal detection processing in parallel with the first signal detection processing;
performing second code error detection processing on the radio packet for user data detected in the second signal detection processing;
in a case in which a code error is not detected in the second code error detection, performing second enqueuing of the radio packet for user data in the reception buffer; and
outputting, at a predetermined timing, one or more radio packets that are enqueued in the reception buffer.

8. The retransmission control method according to claim 7,
wherein the second signal detection processing is capable of reducing an error rate more than the first signal detection processing.

9. The retransmission control method according to claim 7,
wherein the first signal detection processing is single carrier signal detection processing without frequency selectivity distortion compensation, and
wherein the second signal detection processing is single carrier signal detection processing with frequency selectivity distortion compensation.

10. The retransmission control method according to claim 7,
wherein the first signal detection processing is signal detection processing without phase noise compensation, and
wherein the second signal detection processing is signal detection processing with phase noise compensation.

11. The retransmission control method according to claim 7,
wherein the first signal detection processing is signal detection processing without hybrid Automatic Repeat Request (ARQ) processing, and
wherein the second signal detection processing is signal detection processing with hybrid ARQ processing.

* * * * *